United States Patent [19]

Legge et al.

[11] Patent Number: 4,781,967

[45] Date of Patent: Nov. 1, 1988

[54] PAPERMAKER PRESS FELT

[75] Inventors: Robert W. Legge, Bridgewater; William O. Hocking, Jr., Foxboro, both of Mass.

[73] Assignee: The Draper Felt Company, Inc., Canton, Mass.

[21] Appl. No.: 106,065

[22] Filed: Oct. 7, 1987

[51] Int. Cl.[4] .............................................. B32B 5/12
[52] U.S. Cl. ............................ 428/109; 162/DIG. 1; 162/358; 428/232; 428/234; 428/246; 428/280; 428/282; 428/284; 428/293; 428/294; 428/297; 428/298; 428/300
[58] Field of Search ..................... 162/DIG. 1, 358; 428/110, 111, 246, 232, 233, 234, 280, 282, 297, 300, 298, 293, 246, 284, 293, 294, 109

[56] References Cited

U.S. PATENT DOCUMENTS

| | | | |
|---|---|---|---|
| 4,107,367 | 8/1978 | Fekete | 428/282 |
| 4,529,643 | 7/1985 | Lundström | 428/282 |
| 4,533,594 | 8/1985 | Buchanan | 428/280 |
| 4,555,440 | 11/1985 | Crook | 428/282 |
| 4,565,735 | 1/1986 | Murka et al. | 428/234 |

*Primary Examiner*—James J. Bell
*Attorney, Agent, or Firm*—Salter & Michaelson

[57] ABSTRACT

An endless papermaker press felt having a plurality of modular textile structures which include a plurality of layers of fiber materials and a plurality of yarn assemblies in which the yarns in each assembly are located in substantially parallel relation with respect to one another, the layers of fiber materials and yarn assemblies not being bound together by any separate binding structure, the yarns located in at least one yarn assembly being disposed in nonparallel relation with respect to the yarns located in an adjacent yarn assembly, and each modular structure being further capable of having distinct chemical or physical treatments applied thereto.

20 Claims, 2 Drawing Sheets

PAPERMAKER PRESS FELT

BACKGROUND OF THE INVENTION

The present invention relates to an endless, unwoven papermaker press felt that is employed in papermaking apparatus and that is utilized for carrying sheets or webs of paper in the fabrication thereof.

The use of papermaking press felts in the manufacture of paper has been well known in the papermaking field for many years. Because of the relatively large quantities of water that are used in the manufacture of paper sheets, the press felt as utilized for carrying the material from which the paper sheet is made must be constructed in such a manner as to enable water to be easily expressed from the felt as the material is fed through the nip rollers of the press machine. Further, it is desirable in the fabrication of paper sheet to avoid marking of the sheet as the material is fed through the nip rolls. Marking can occur if the press felt is formed of a woven material, for example, which necessarily includes so-called "knuckles" and that tend to project into the upper surface of the felt thereby marking the paper sheet as the sheet is fed through the nip rolls.

Some efforts have been made heretofore to avoid the use of woven materials in a papermaking felt, and one such unwoven papermaker's felt is illustrated and described in U.S. Pat. No. 3,097,413. As described in U.S. Pat. No. 3,097,413, the use of the unwoven endless press felt avoided the need for weaving equipment normally associated with the prior known woven felts. Various other types of press felts have been developed using unwoven layers of material, and one such press felt is illustrated in U.S. Pat. No. 4,555,440. In this patent, the press felt as disclosed avoids the use of woven materials but binds the adjacent layers by a binding thread which is passed perpendicularly through the layers and extends in the cross machine direction relative thereto. Other kinds of unwoven and similar types of papermaking press felts of which applicant is aware are illustrated in U.S. Pat. Nos. 2,943,379; 3,086,276; 3,331,140; 3,392,079; 3,401,467; 3,629,047; 3,657,068; 3,772,746; 4,224,372; 4,503,113 and 4,541,895.

Although the press felts as illustrated and described in the aforementioned U.S. patents have performed satisfactorily for limited purposes, they have not been totally satisfactory from a commercial point of view and are difficult to fabricate with present known equipment and, furthermore, are relatively expensive in the manufacture thereof. As will be described hereinafter, applicant's unique press felt avoids the problems of the prior known felts and provides a press felt of composite structure that is so constructed as to readily accept water, hold it in the void areas of the felt, and quickly release it from the backside of the felt so that improved results are obtained in the papermaking operation, while at the same time presenting an exceptionally smooth felt surface to the paper sheet. The present invention also avoids any unevenness in the surface thereof that may result from the use of weaving looms, and further eliminates the need for any special joining process.

SUMMARY OF THE INVENTION

The present invention includes a papermaking press felt that includes a plurality of layers of modular textile structures formed of textile fibers, each of said textile structures or modules being formed of fiber batt layers or yarn structures or a combination of both. Located adjacent to some of the batt layers is an array of yarn, each array of yarn being comprised of a plurality of parallel yarns, and each yarn array being united to a batt layer.

A module with both batt and yarn is defined as a yarn assembly. The yarn assemblies are not fixed to each other by any binding structure, and the yarns of at least one such module are disposed in nonparallel relation with respect to the yarns of an adjacent module. The outer modules are united to each other and the inner modules by needling, the modules being located in overlying parallel relationship with respect to one another.

The invention contemplates forming the individual yarns of the yarn arrays of a noncompressive material, the noncompressibility of the yarn material enabling the felt to be passed through the press nip rollers without the yarns compacting, thereby enabling the voids as defined by the yarn assemblies to be preserved for holding water therein for release from the backside of the felt at the nip rollers.

In order to promote the effective release of the water on the backside of the felt, the invention also contemplates having the yarns of the uppermost yarn assembly formed of a relatively small size, thereby providing a smooth upper surface. The yarns of the yarn assembly located just below the topmost assembly is defined by a size that is somewhat larger than that of the topmost assembly, and at least a third assembly is provided that includes yarns that are of a size that is larger than of the intermediate assembly. This so-called stratification of the modules provides for easy transmission of water through the felt for release at the backside thereof as the felt is passed through the nip rollers. The surface smoothness and compaction resistance combined with the layered structure of the modules produce a felt of stable structure that does not have to be constructed on conventional papermaker feltweaving looms and its associated winding and beaming equipment, nor is any stitching equipment utilized in making the felt of the subject invention. This further enables the finished felt to be constructed in a shorter period of time than the conventional woven felt.

Accordingly, it is an object of the present invention to provide an endless press felt preferably formed of unwoven materials and composed of a plurality of modules of textile fibers consisting of fiber batt layers, yarn structures and combinations of both that cooperate to produce a press felt of superior construction.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE VARIOUS EMBODIMENTS

Figures 1, 2:
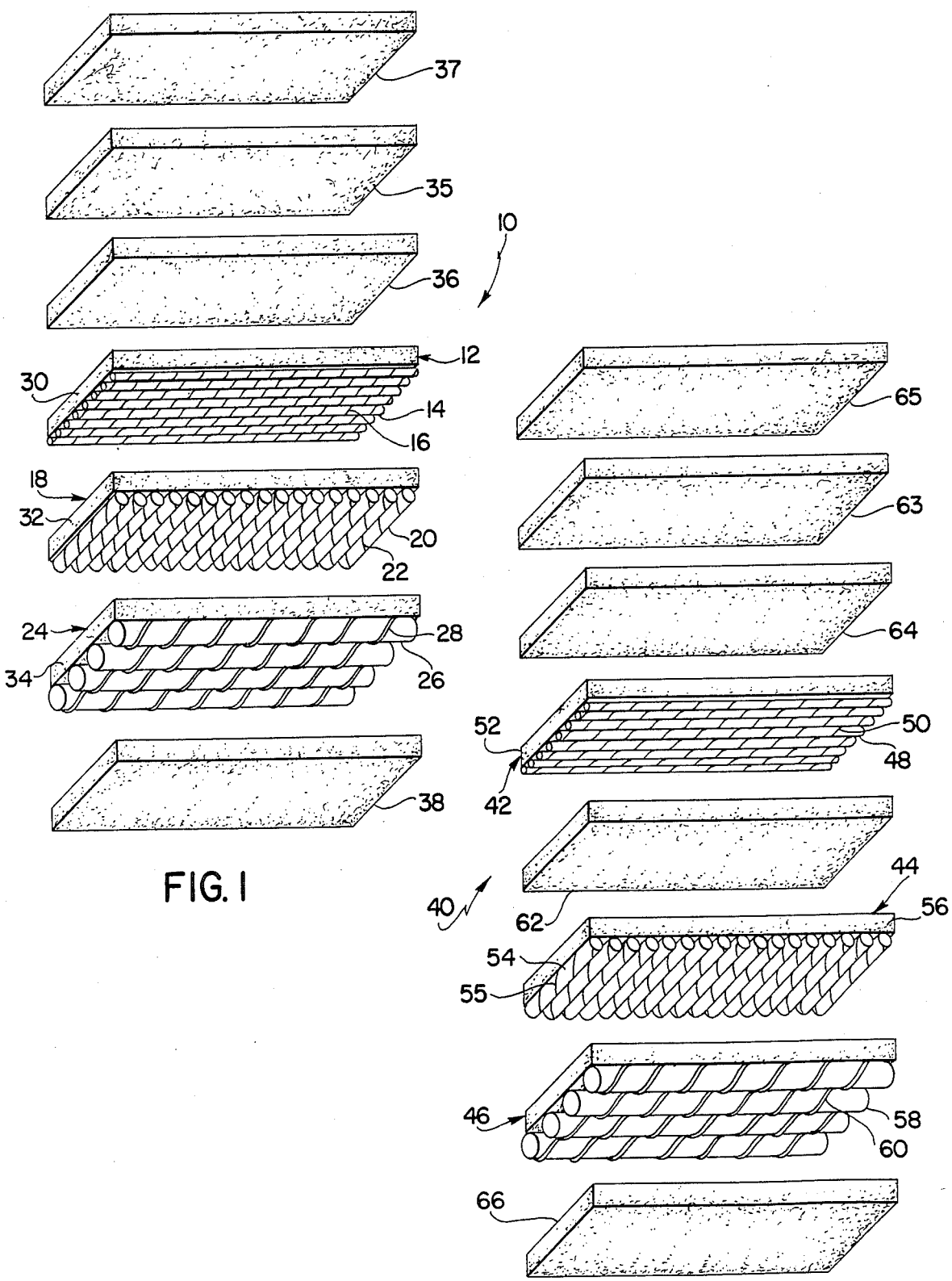
FIG. 1 is an exploded perspective view of one form of a papermaking press felt as embodied in the present invention.
FIG. 2 is an exploded perspective view of a modification thereof.

Referring now to the drawings and particularly to FIG. 1, one form of a papermaker press felt is illustrated and is generally indicated at 10, the felt 10 being shown with the component layers thereof in exploded form for purposes of illustration. In accordance with the present invention, the papermaker press felt 10 is defined by a composite structure that consists of a plurality of modules of which are included fibrous batt modules and supporting yarn assembly modules having parallel yarns, with at least one of the yarn assembly modules being located such that the yarns thereof are disposed in nonparallel relation with respect to the yarns of an adjacent yarn assembly module.

As shown in FIG. 1, a modular upper yarn assembly is generally indicated at 12 and consists of an array of yarns including a plurality of parallel yarns 14, each of which may consist of a monofilament, multifilament or staple fiber and may also be formed of a ply, cable, braid, or twist construction. It is contemplated that variouus yarn structures can be utilized in the modules, and such structures may consist of any textile fiber, natural or synthetic, including but not limited to polyester, polyamide, polyolefin, such as polypropylene or polyethylene, polymers of vinyl chloride, polyacrylonitrile, polyurethane, wool or cotton. Various combinations of the fibers can also be blended to serve various purposes in a finished felt. In this connection, one form of the subject invention may consist of a two or three ply monofilament yarn with a high twist factor of 8-15 twists per inch to create a relatively stiff, noncompacting, hard yarn with a softer staple fiber yarn 16 wound in a convoluted manner in the longitudinal direction thereof. The staple fiber yarn 16 aids in the stability of the modular upper yarn assembly 12, and further aids in the retention of a fibrous batt in the assembly as will be described.

The polyamide yarn is preferred because of its superior characteristics which include overall toughness, resistance to distortion, and its resistance to papermaking chemicals. Further, because of its heat setting capabilities and heat-set properties, which are important for dimensional size control in a finished felt product, a polyamide fiber does form an ideal material for the yarn.

As will be described, the denier of the fibers and the diameter of the yarns in a module will vary depending upon the location of the module in the felt. In this connection, yarn diameters can range from 0.001 inches to 0.300 inches; and if the yarn is formed in a twisted construction, the twists per inch can range from 0-40 depending upon the yarn weight and type of construction, i.e., single or plied. Yarn weights may range from 50 grains per 100 yards to 15,000 grains per 100 yards. Hard, incompressible, highly twisted, yarns are desirable for use in the subject invention because of their ability to maintain void volume in the felt, as will be described, which is necessary to absorb and carry or transfer water from the paper sheet as the sheet is subjected to high nip loadings at the nip rollers of the papermaking machine press. The plied construction is also desirable since this aids in the preservation of the fibrous batt when the press felt is in use.

As illustrated in FIG. 1, the parallel yarns 14 that are included in the module or yarn assembly 12 are located in spaced-apart relation with respect to each other; and in this connection, they may be disposed in a manner to define a density range of 6-150 ends per inch, depending upon the makeup of a particular press felt. If the size of the yarns are varied to define a stratified disposition of the yarn modules, the modular assembly 12 may contain fine yarns that have a density of 40-150 yarns to the inch. A middle modular yarn assembly generally indicated at 18 may contain medium size yarns at 20-72 yarns per inch, and a bottom modular yarn assembly generally indicated at 24 may contain coarser or heavier yarns that are disposed at 6-24 yarns per inch. However, it is understood that all of the modular yarn assemblies in the felt construction may contain the same size yarn at the same density. In the preferred embodiment of the invention the top yarn assembly 12 includes yarns in the 120 grains per 100 yards range having a density of 36, the middle yarn assembly with yarns in the 360 grains per 100 yards range having a density of 24, and the coarser bottom yarn assembly 24 including yarns having a weight of 1,000 grains per 100 yards and a density of 12.

Referring again to FIG. 1, the middle or intermediate modular yarn assembly 18 includes an array of parallel yarns 20, and a staple fiber yarn 22 which forms a part of the parallel yarns 20 is located therein. As illustrated, the array of yarns 20 are disposed in transverse relation with respect to the direction of the yarns 14 of the modular yarn assembly 12. In this connection, the array of yarns 14 may be disposed in the machine direction while the array of yarns 20 will be disposed in the cross-machine direction. Located below the modular yarn assembly 18 is the modular yarn assembly 24 that includes coarse yarns 26 having a staple fiber 28 located thereon. It will also be noted that the yarns 26 of the lower modular yarn assembly 24 extend in a direction that is parallel to the array of yarns 14 of the modular yarn assembly 12 but that is transverse to the array of yarns 20 of the modular yarn assembly 18. The positioning of the parallel array of yarns in the modular yarn assemblies 18 and 24 and the density thereof fall within the range as described hereinabove.

As shown in FIG. 1, each of the modular yarn assemblies 12, 18 and 24 contains fibrous batt layers which may be made on any conventional carding equipment that is known to those skilled in the art of processing common textile fibers. The fibrous batts which are indicated at 30, 32 and 34, respectively, may be formed of the same polymeric or natural fibrous material which comprise the aforementioned yarns. The preferred fibrous batt material is polyamide because of its chemical and physical properties as also mentioned hereinabove. In addition, polyamide has excellent abrasion-resistant characteristics. The fibers of the batt layers or webs will range from 1.5 denier to 60 denier. The staple length of the fibers may range from 2 inches to 6 inches with a preferred range of 3-4.5 inches in length. Normally the batt web is formed on a typical carding machine and associated traversing aprons which layer the webs into desired weights. A typical module weight would be from 1-60 ounces per square yard and the preferred batt weights range from 5-20 ounces per square yard, as incorporated in the subject invention. The fibers of the batt are normally located in a somewhat random relationship; although, if required, the batt fibers may be located in an oriented, somewhat parallel arrangement with the use of special equipment. It is seen that the fibrous batt layers and yarn arrays are united together to form the modular yarn assemblies 12, 18 and 24. It is understood that the fibrous batt webs and the yarn arrays can be united by various techniques. One such technique includes the bonding of the yarn array to the fibrous batt by needling or by using an adhesive or a hot melt resin in particle, fiber, sheet or spray form. Other methods or combinations of methods of bonding the batt to the yarns would be obvious to those skilled in the art of laminating substrates together. In the subject invention, the needling technique is preferred, and needling techniques are known and are quite common in the papermaking felt trade, and such mechanics of needling are not believed required for this description.

As illustrated in FIG. 1, the modular yarn assemblies are positioned one over the other but may be located in various relative positions. Various combinations with any number of modules are possible without departing from the spirit or intent of the subject invention, as will be set forth in the other modified forms of the invention as described hereinafter and in accordance with the desired end use of the felt. As an example, the yarn array of a module may be positioned adjacent to the yarns of the next module or the batt component may be positioned adjacent to another batt component.

The construction of the felt 10 is completed by locating batt modules 35, 36 and 37 at the uppermost or top end of the felt, while batt module 38 may be located at the lowermost end of the felt as indicated in Fig.1. The batt modules 35, 36, 37 and 38 may also be needled into the felt for uniting the batt webs to the modular yarn assemblies and to provide additional properties of smoothness and stability.

It is seen that the arrangement of modules as shown in FIG. 1 provides a unique construction, particularly in view of the use thereof in an endless press felt. Because the felt is endless, absolute uniformity is obtained; and because of the arrangement of the yarn assemblies, no crossover or knuckles of yarn are present as are inherent in woven fabrics as used in the commonly known felts, thereby avoiding any marring or marking of the sheet material that is carried by the subject felt during the papermaking operation. By locating the modular yarn assemblies in a crosswise direction relative to each other, voids are formed that inherently provide for the direction of water thereto, allowing the felt to readily accept the water for holding it in the void areas and quickly releasing it from the backside of the felt. By further utilizing high twist yarns in the yarn assemblies, the fiber bonding of the batt layers is improved, and bonding to the lengthwise yarns in the yarn assemblies is also improved. As a result, full width stabilization is obtained in accordance with paper mill applications that experience fabric edge stress.

It is further seen that the use of the finer yarns at the uppermost yarn assembly 12 is necessary to produce a very smooth surface without knuckles or crossover points on the top layer or paper side of the felt. The ability of the yarns because of their noncompressibility to withstand compaction and to retain the void volumes while under high pressure at the press roll nip is essentially the result of the higher yarn twists used and the resistance to deformation under press load.

It is seen that the press felt of the subject invention is formed by an unwoven layer of materials having no stitching or yarn crossover or knuckles which would adversely mark a paper sheet under high nip pressure. The press felt of the subject invention is not only completely uniform because of its unique modular construction, but the pressure exerted by high nip loading is more uniform, resulting in more uniformity of moisture in the paper sheet. With a better surface provided for by the finer yarns and batt webs in the upper yarn assembly 12, higher pressures can be exerted without the fear of adversely marking the paper sheet. Thus, the invention combines surface smoothness and compaction resistance to a higher degree than those endless press felts known heretofore.

It is further seen that by providing the modular structures in the felt, the finer yarns can be placed near the sheet side surface, and the coarser yarns can be placed on the roll side or inside surface of the felt without the use of any tiein threads, as in a knitting or stitching operation, where the threads could impart or result in marking the paper sheet under load. It is also seen that the invention defines a stable unwoven structure due in part to the higher twist of the yarns in the intermediate modular yarn assembly which is disposed in angular relation relative to the direction of the yarns of the outer modular yarn assemblies. By providing the nonwoven layers with the cross direction strengthening yarns, the yarns have increased stability and are not easily skewed when running wet in the paper machine operation. Thus the subject invention, although utilizing unwoven structures is exceptionally stable.

By constructing the felt from modules as described, the invention does not require large capital expense because heavy, especially constructed, papermaker's felt weaving looms and the associated winding and beaming equipment are not required in the construction of the felt.

Referring now to FIG. 2, a modified form of a press felt is illustrated and is generally indicated at 40. The press felt 40 includes an upper modular yarn assembly generally indicated at 42, an intermediate modular yarn assembly generally indicated at 44, and a lower modular yarn assembly generally indicated at 46. The upper yarn assembly 42 includes a yarn array comprised of a plurality of parallel yarns 48 on which a staple fiber 50 is located as hereinabove described. The yarns 48 may be formed of those materials as described above in connection with the felt 10, and the staple fiber 50 is also formed of those materials referred to above. Supported by an array of yarns including a plurality of parallel yarns 48 is a fibrous batt web 52 in which the fibers thereof are normally placed in random relation.

The intermediate yarn assembly 44 is defined by an array of yarns comprised of a plurality of yarns 54, the direction of which is transverse to the direction of the yarns 48 of the yarn assembly 42. It is also understood that the yarns 54 may be disposed in any suitable angular relationship with respect to the yarns 48 depending upon the requirements of the end use of the felt. In this connection, it is seen that the angular relationship between the yarns 48 and 54 will define voids for receiving, retaining and expressing water through the felt 40 and for further preventing compacting of the yarns as the press felt is moved into the high load nip area of the papermaking machine. Supported by the yarns 54 is a fibrous web 56, the content of which is similar to the fiber batts as described above. Located below the yarn assembly 44 is the yarn assembly 46 in which the coarse yarns 58 are located, the direction of the coarse yarns 58 being shown as transverse to the direction of the yarns 54 of the intermediate yarn array 44. The coarse yarns 58 including the staple yarn 60 are also formed of materials as described above in connection with the felt 10.

Disposed intermediate of the felt 40 and between the modular yarn assemblies 42 and 44 is an intermediate fibrous batt module 62. The fibrous batt module 62 may be united with the modular yarn assemblies 42, 44 and 46 by the needling thereof in a subsequent operation. Disposed at the uppermost end of the felt 40 are web modules 63, 64 and 65, and located at the bottommost end of the felt is a batt module 66. The modules 62, 63, 64, 65 and 66 as united with the modular yarn assemblies 42, 44 and 46 define the complete felt that is composed of a plurality of modular layers that support one another and as shown are located in a suitable arrangement to form a stable construction. The composite structure of FIG. 2 consists of three yarn assemblies with at least one modular yarn assembly including a yarn array having yarns that are positioned at an angle to the yarns of the adjacent modular yarn assemblies, and all the yarn assemblies comprising inner layers which are sandwiched between the modules 63, 64, 65 and 66 that define the outer layers. In the form of the invention as illustrated in FIG. 2, the inner module 62 cooperates with the outer modules 63, 64, 65 and 66 to provide a cushioning effect for the yarn assemblies as the felt is moved through the nip rollers of the press machine.

Figure 3:
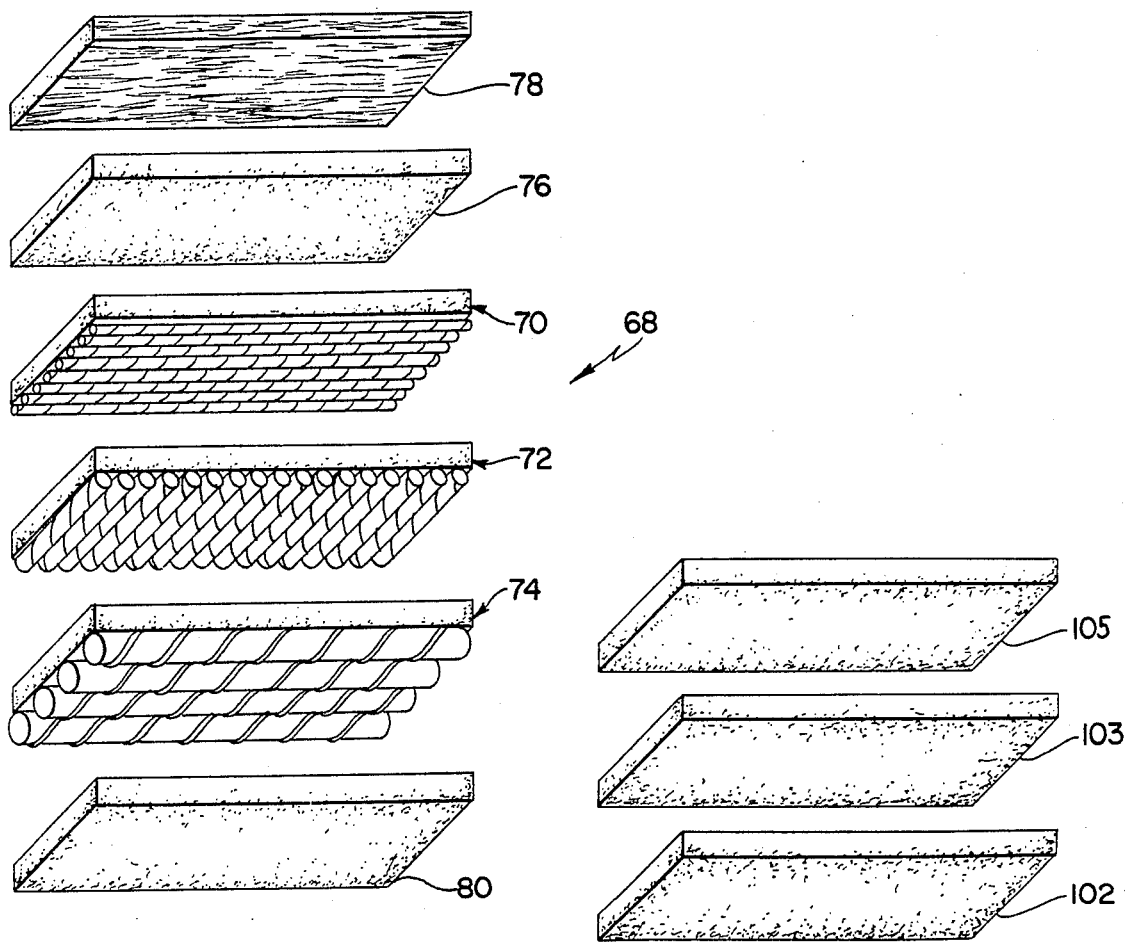
FIG. 3 is an exploded perspective view of a further modification thereof.

Referring now to FIG. 3, another variation or modification of the invention is illustrated and includes a press felt generally indicated at 68. Modular yarn assemblies generally indicated at 70, 72 and 74 are constructed in the manner as illustrated and described above for the press felts 10 and 40 shown in FIGS. 1 and 2. In FIG. 3, an intermediate batt module which is indicated at 76 is disposed between the upper modular yarn assembly 70 which has finer yarns located therein and an outer fiber batt module indicated at 78. A lower batt module 80 cooperates with the modules 76 and 78 to sandwich the modular yarn assemblies 70, 72 and 74 therebetween, the upper batt modules 76 and 78 further providing a cushioning effect for insuring that the upper surface of the felt 68 will be smooth for preventing marring or marking of the paper carried by the felt 68 during the papermaking operation. If desired, the module 78 may comprise an oriented fiber web to further insure the smoothness of the felt surface.

Figure 4:
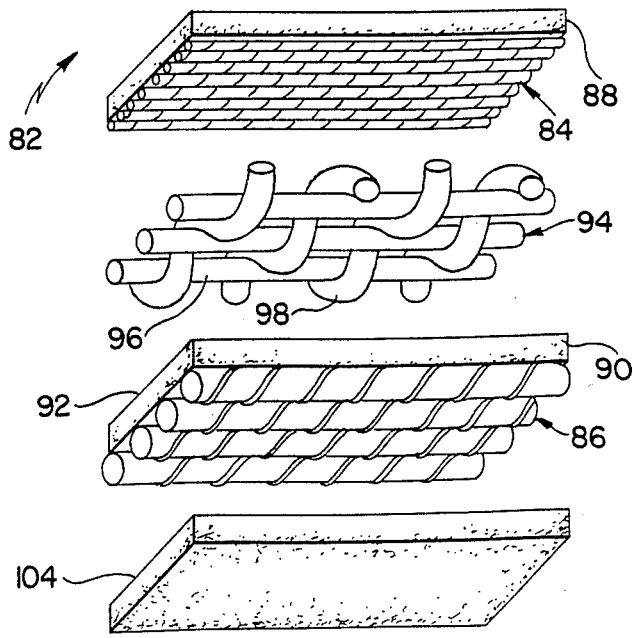
FIG. 4 is an exploded perspective view of a still further modification thereof.

In FIG. 4, a further variation of the press felt of the subject invention is illustrated and is generally indicated at 82. The press felt 82 includes an upper modular yarn assembly 84 in which finer yarns are disposed and a lower modular yarn assembly 86 in which the coarse yarns or heavier denier yarns are located. The upper yarn assembly 84 further includes a batt module 88 that is supported by the fine yarn modular yarn assembly 84, and the lower yarn assembly 86 includes a fiber batt 90 that is supported by the coarse yarn arrays indicated at 92. Although it is not preferred to use a woven material in the subject invention, it is possible to intersperse a layer of woven material indicated as an intermediate modular yarn assembly 94 in FIG. 4 without departing from the scope of the invention. As shown, the intermediate module 94 includes woven yarns 96 and 98, which can be woven by any suitable weaving equpment now in use. Since the felt 82 further includes an upper fiber batt module 102 and a lower fiber batt module 104, the possibility of the knuckles that are present in the intermediate array 94 will be absorbed and will not result in any marking of the paper as carried on the paper side of the felt. Modules 102, 103, and 105 may be added to the structure and will further enhance the smoothness of the felt.

It is seen that the form of the invention as set forth herein and the various modifications includes modules of yarn arrays and batts that are located in various arrangements to define the felt. By incorporating noncompressible yarns in the various modules, it is possible to construct a felt that is less susceptible to distortion, especially at the high nip loading areas of the paper machine press. Retention of the original yarn structure is essential for maintaining void volume and for preventing the uppermost modules from indenting under pressure into the interstices of the larger diameter yarns of the bottom layer.

It will be apparent from the description of the invention hereinabove that one of the unique features of this invention is in the modular-type construction of the press felt that is obtained by the layering of specific units of a batt and yarn assembly. Any of the modular yarn assemblies that consist of a batt or web and yarn array can be constructed of certain specified materials which would give predetermined physical properties to the felt which otherwise could not be obtained. An advantage is that the use of separate modular yarn assemblies imparts to the felt exceptional dimensional stability which is required in papermaker felts, especially with those that include unwoven fabrics. In this connection, the batt fibers in a yarn assembly or in any module can be oriented in a cross-machine direction, i.e., transverse to the machine direction layer and parallel to the parallel array of yarns in the cross-machine direction, wherein stability is provided by the oriented fibers as well as from the yarn array.

Another advantage of utilizing a modular construction is that various chemical or physical treatments can be incorporated into the felt, the treatment being contained within the specific boundary of the individual batt module or modular yarn assembly with no bleeding or leaching to other assemblies or otherwise affecting the other fiber modules. It is obvious that several different treatments may be utilized within the same felt simply by treating individual assemblies before they are layered into a finished felt. An example of such a chemical treatment is one in which the bottom layers of the felt could have an incompresible, hard, polymeric resin coating while a central or top layer could have a relatively softer polymeric coating cushioning layer, such as a urethane or rubber, which would also impart resilience to the top layers. By being both hard and resilient, the felt will resist compaction over its lifetime. Also, the use of a batt material in the assembly has the advantage of being able to be treated and united with a yarn array that is treated differently. Examples of physical treatments include calendaring, heat setting or pretensioning. If desired, the finished felt may also have an entirely different treatment applied thereto.

Still, another advantage of the modular construction is that a variety of fiber webs and a variety of yarns could be employed in well defined locations within the same felt. As an example, mineral, metal or carbon yarns or fibers may be added to specified layers of the modular felt. Such materials would add noncompressibility to the finished press felt.

Still a further advantage of employing a modular construction is that a specified polymeric resin could be utilized in a closely defined location within the body of the press felt. Thus, a yarn assemblycould be processed by methods such as described in U.S. Pat. No. 3,613,258, which illustrates the fixing of monfilament strands to a felt. In the press felt of the subject invention, some of the modules could be united by extrusion with a polymeric strand of material. The extruded polymeric strand could also be selectively positioned within a module. The unique properties of the polymeric resin could be incorporated into the felt, i.e., the resin properties which would be selected by the criteria demanded by properties of a particular felt.

While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An endless, unwoven press felt comprising a plurality of unwoven yarn assemblies that are located in overlying adjacent parallel relation with respect to one another, each of said yarn assemblies being composed of a plurality of layers of textile material in which is included at least one layer of fibrous batt material and a layer of an array of yarns that is defined by a plurality of yarns that are disposed substantially parallel to one another, said layer of fibrous batt material supporting the layer of array of yarns in each yarn assembly, the layer of array of yarns in one yarn assembly being disposed in nonparallel or transverse relation with respect to the layer of array of yarns in an adjacent assembly, and said overlying adjacent yarn assemblies being united together without the interconnection of a separate yarn binding means extending therebetween.

2. An endless felt as claimed in claim 1, the yarns in the layer of yarns of the topmost yarn assembly having a predetermined size, and the yarns in the layer of yarns of at least one other yarn assembly that is located below said topmost yarn assembly having a size that is greater than the size of the yarns of the topmost yarn assembly.

3. An endless felt as claimed in claim 1, the batt fibers of the topmost fibrous batt layer having a predetermined denier and the batt fibers of at least one other batt layer that is located below said topmost fibrous batt layer having a denier that is greater than the denier of the fiber of the topmost fibrous batt layer.

4. An endless felt as claimed in claim 1, the yarns of each of said layer of yarns in a yarn array consisting of staple fibers.

5. An endless felt as claimed in claim 1, said yarns including a synthetic monofilament.

6. An endless felt as claimed in claim 1, said yarns including a material that is plied, twisted or braided.

7. An endless felt as claimed in claim 1, the yarns of each of said layers of array of yarns including a material selected from a group consisting of polyester, polyamide, polyolefin, polymers of vinyl chloride, polyacrylonitrile, polyurethane, cotton, rayon and wool.

8. An endless felt as claimed in claim 1, at least one of said fibrous batt layers being disposed between adjacent yarn assemblies and providing a cushion therefor.

9. An endless felt as claimed in claim 1, the layer of array of yarns of one of said yarn assemblies being located in adjacent nonbinding relation with respect to the layer of array of yarns of an adjacent yarn assembly.

10. An endless felt as claimed in claim 1, a fibrous batt layer without attached yarn arrays being located adjacent to another fibrous batt layer.

11. An endless felt as claimed in claim 1, the nonparallel relationship of the layer of array of yarns of said one yarn assembly with respect to the layer of array of yarns of an adjacent yarn assembly being defined by locating the yarn assemblies at right angles to each other.

12. An endless felt as claimed in claim 1, at least one of said fibrous batt layers being formed of a material selected from a group consisting of polyester, polyamide, polyolefin, polymers of vinyl chloride, polyacylonitrile, polyurethane, cotton, rayon and wool.

13. An endless felt as claimed in claim 1, the fibers in said fibrous batt layers having a size in the range of 1.5-60 denier.

14. An endless felt as claimed in claim 1, the staple length of the fibers in said fibrous batt layers ranging from 2 inches to 6 inches.

15. An endless felt as claimed in claim 1, said fibrous batt layers being united to an adjacent yarn assembly to define a unit therewith by needling, or by adhesion with resin materials.

16. An endless felt as claimed in claim 1, at least some of said fibrous batt layers being preneedled prior to being united with said yarn assemblies.

17. An endless felt as claimed in claim 1, at least one yarn assembly including a layer that is formed of a woven material.

18. An endless felt as claimed in claim 1, an intermediate yarn assembly, the yarns of the array of yarns of which have a size that is greater than the size of the yarns of said top yarn assembly but that is less than the size of the yarns of said other yarn assembly, the stratification of said yarn sizes providing for more efficient expressing of water through said felt in the use thereof.

19. An endless felt as claimed in claim 1, at least one of said fibrous batt layers defining the bottom layer of said felt and being treated with an incompresible, hard, polymeric resin coating.

20. An endless felt as claimed in claim 19, at least one other of said fibrous batt layers defining a top layer of said felt and having a relatively soft polymeric cushioning coating applied thereto.

* * * * *